United States Patent
Enslin et al.

(10) Patent No.: US 11,135,939 B2
(45) Date of Patent: Oct. 5, 2021

(54) SYSTEM AND METHOD FOR HYBRID-ELECTRIC VEHICLE BATTERY CAPACITY ESTIMATION

(71) Applicant: FORD GLOBAL TECHNOLOGIES, LLC, Dearborn, MI (US)

(72) Inventors: Heinrich Enslin, Dearborn, MI (US); Jeffery R. Grimes, Willis, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 140 days.

(21) Appl. No.: 16/688,508

(22) Filed: Nov. 19, 2019

(65) Prior Publication Data

US 2021/0146796 A1   May 20, 2021

(51) Int. Cl.
| | |
|---|---|
| *B60L 58/12* | (2019.01) |
| *B60L 50/61* | (2019.01) |
| *H01M 10/42* | (2006.01) |
| *H02J 7/14* | (2006.01) |
| *H02J 7/00* | (2006.01) |

(52) U.S. Cl.
CPC ............ *B60L 58/12* (2019.02); *B60L 50/61* (2019.02); *H01M 10/4257* (2013.01); *H02J 7/0029* (2013.01); *H02J 7/1446* (2013.01); *H02J 7/1461* (2013.01); *B60L 2240/549* (2013.01); *H01M 2010/4271* (2013.01); *H01M 2220/20* (2013.01); *H02J 7/00304* (2020.01)

(58) Field of Classification Search
CPC .... B60L 58/12; B60L 50/61; H01M 10/4257; H01M 2010/4271; H01M 2220/20; H02J 7/1446; H02J 7/0029; H02J 7/00302; H02J 7/00304; H02J 7/00306; H02J 7/00308; H02J 7/00309; H02J 7/0047; H02J 7/0048; H02J 7/0049; H02J 7/005
USPC .................................................. 320/104
See application file for complete search history.

(56) References Cited

U.S. PATENT DOCUMENTS

| | | | |
|---|---|---|---|
| 6,417,668 B1 | 7/2002 | Howard et al. | |
| 8,004,243 B2 | 8/2011 | Paryani et al. | |
| 8,615,372 B2 | 12/2013 | Tomura et al. | |
| 9,428,060 B2* | 8/2016 | Lasson | B60L 50/40 |
| 9,849,871 B2* | 12/2017 | Dunlap | B60W 10/08 |
| 9,987,944 B2* | 6/2018 | Dunlap | B60L 58/12 |
| 10,434,898 B2* | 10/2019 | Williams | B60L 58/20 |
| 10,854,933 B2* | 12/2020 | Hao | G01R 19/16542 |
| 10,864,813 B2* | 12/2020 | Lahr | B60K 6/383 |
| 10,978,903 B2* | 4/2021 | Tabatowski-Bush | H02J 7/0021 |
| 2010/0289453 A1* | 11/2010 | Firehammer | H02J 7/0016 320/118 |

(Continued)

*Primary Examiner* — M Baye Diao
(74) *Attorney, Agent, or Firm* — David B. Kelley; Brooks Kushman P.C.

(57) ABSTRACT

An electrified vehicle includes a powertrain that includes an engine and an electric machine. The vehicle includes a traction battery that is charged and discharged by operation of the engine and the electric machined. The vehicle includes a controller programmed to operate the engine and the electric machine to satisfy a driver power demand. The controller is also programmed to initiate an estimated of a capacity of the traction battery under predetermined conditions. The controller operates the engine and the electric machine to satisfy the driver power demand and charge and discharge the traction battery in a predetermined manner to create conditions favorable for estimating the capacity.

20 Claims, 3 Drawing Sheets

(56) References Cited

U.S. PATENT DOCUMENTS

2020/0369259 A1* 11/2020 Huq .................... B60W 10/06

* cited by examiner

SYSTEM AND METHOD FOR HYBRID-ELECTRIC VEHICLE BATTERY CAPACITY ESTIMATION

TECHNICAL FIELD

This application generally relates to a system and method for operating a vehicle powertrain for estimating a capacity of a traction battery.

BACKGROUND

Hybrid-electric vehicles use electrical energy for propulsion and various other features. Electrical energy is stored onboard and used as needed. The hybrid-electric vehicle must manage energy usage and monitor the amount of energy available at any time. The capacity of the energy storage device represents the amount of energy that can be stored by the battery. Various algorithms are used to estimate battery capacity.

SUMMARY

A vehicle includes a traction battery, an engine and an electric machine. The vehicle further includes a controller programmed to (i) operate the engine and the electric machine to satisfy a driver power demand during a drive cycle, (ii) responsive to a value representing an accumulated current leaving the traction battery exceeding a predetermined threshold, operate the engine and the electric machine to continuously discharge the traction battery and satisfy the driver power demand, (iii) responsive to a state of charge of the traction battery falling below a first threshold, operate the engine and the electric machine to continuously charge the traction battery at a predetermined current and satisfy the driver power demand, and (iv) responsive to the state of charge exceeding a second threshold, operate the engine and the electric machine to satisfy the driver power demand such that the traction battery is charged and discharged.

The controller may be further programmed to, responsive to the state of charge falling below the first threshold, operate the engine and the electric machine such that no current flows into or from the traction battery for a predetermined time interval and satisfy the driver power demand. The controller may be further programmed to, responsive to the state of charge exceeding the second threshold, operate the engine and the electric machine such that no current flows into or from the traction battery for a predetermined time interval and satisfy the driver power demand. The controller may be further programmed to, responsive to the state of charge exceeding the second threshold, operate the engine and the electric machine to ramp a current supplied to the traction battery to zero and satisfy the driver power demand. The predetermined current may be a constant current. The first threshold may be less than the second threshold. The controller may be further programmed to, responsive to the state of charge exceeding the second threshold, output a battery capacity estimate based on a first state of charge estimated immediately prior to continuously charging the traction battery, a second state of charge estimated after continuously charging the traction battery, and an integration of battery charge current over a duration associated with continuous charging.

A battery management system for a vehicle includes a traction battery. The battery management system further includes a controller programmed to, (i) responsive to a value representing an accumulated current leaving the traction battery exceeding a predetermined threshold, request a powertrain controller to operate an engine and an electric machine to continuously discharge the traction battery, (ii) responsive to a state of charge of the traction battery falling below a first threshold, request the powertrain controller to operate the engine and the electric machine to continuously charge the traction battery at a predetermined current, and (iii) responsive to the state of charge exceeding a second threshold, change and output an estimate of a capacity of the traction battery.

The controller may be further programmed to, change the estimate of the capacity based on a first state of charge estimated immediately prior to continuously charging the traction battery, a second state of charge estimated after continuously charging the traction battery, and an integration of battery charge current over a duration associated with continuous charging. The controller may be further programmed to, responsive to a state of charge of the traction battery falling below the first threshold, request the powertrain controller to operate the engine and the electric machine such that no current flows into or from the traction battery for a predetermined time interval. The controller may be further programmed to, responsive to expiration of the predetermined time interval, estimate an initial state of charge based on a measurement of a terminal voltage of the traction battery. The controller may be further programmed to generate a value that is an integration of a current flowing into the traction battery over a time interval in which the traction battery is continuously charged. The controller may be further programmed to, responsive to a state of charge of the traction battery exceeding the second threshold, request the powertrain controller to operate the engine and the electric machine such that no current flows into or from the traction battery for a predetermined time interval. The controller may be further programmed to, responsive to expiration of the predetermined time interval, estimate a final state of charge based on a measurement of a terminal voltage of the traction battery. The controller may be further programmed to, responsive to changing the estimate of the capacity, charge and discharge the traction battery according the estimate.

A method of operating a vehicle includes operating an engine and an electric machine to satisfy a driver power demand and to continuously discharge a traction battery responsive to a value representing an accumulated current leaving the traction battery exceeding a predetermined threshold. The method further includes operating the engine and the electric machine to satisfy the driver power demand and to continuously charge the traction battery at a predetermined current responsive to the traction battery having been discharged to a first state of charge below a lower threshold. The method further includes operating the engine and the electric machine to satisfy the driver power demand responsive to the traction battery having been charged to a second state of charge exceeding an upper threshold. The method further includes changing an estimate of a capacity of the traction battery responsive to the traction battery having been charged to the second state of charge.

The method may further include operating the engine and the electric machine to satisfy the driver power demand such that no current flows into or from the traction battery for a predetermined time interval responsive to the traction battery having been discharged to the first state of charge. The method may further include operating the engine and the electric machine to satisfy the driver power demand such that no current flows into or from the traction battery for a predetermined time interval responsive to the traction battery having been charged to the second state of charge. The method may further include operating the engine and the electric machine to satisfy the driver power demand according to a power split that minimizes fuel usage responsive to the estimate of the capacity being changed. The method may further include charging and discharging the traction battery according to the estimate of the capacity.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
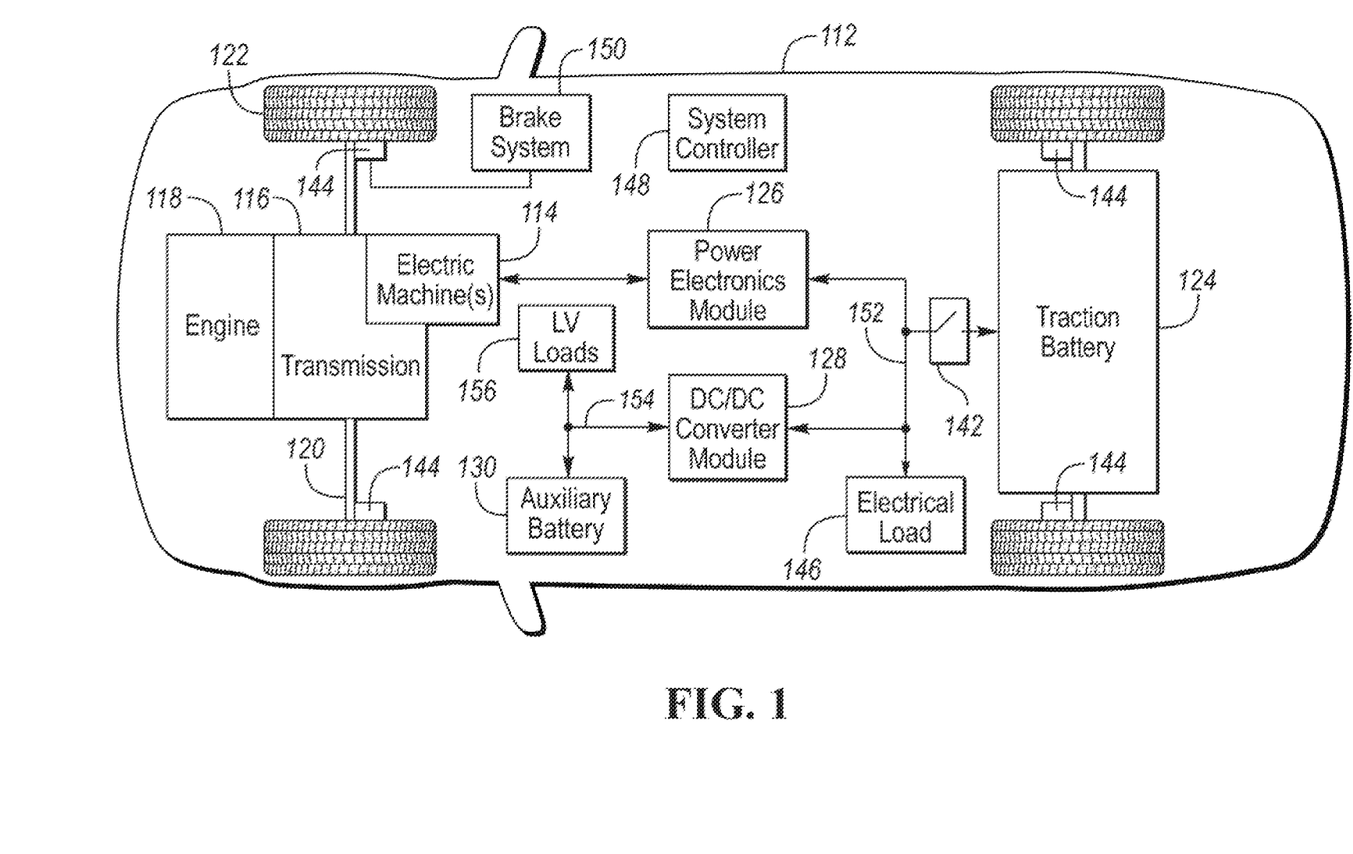
FIG. 1 is a possible configuration for an electrified vehicle illustrating drivetrain and energy storage components.

FIG. 1 depicts a hybrid-electric vehicle 112 that may be referred to as a full hybrid-electric vehicle (FHEV). The hybrid-electric vehicle 112 may include a hybrid-electric powertrain for providing vehicle propulsion. The hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

Wheel brakes 144 may be provided for stopping the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

The hybrid-electric powertrain may include those systems that contribute to propulsion of the vehicle 112. For example, the hybrid-electric powertrain may include the engine 118, the electric machines 114, the hybrid transmission 116, the traction battery 126, and the power electronics module 126. In addition, one or more controllers (e.g., VSC 148) may be present to control and manage operation of the hybrid-electric powertrain. The hybrid-electric powertrain may be operated to achieve a driver power demand while optimizing fuel economy and/or energy usage. The driver power demand may include a driver propulsion demand that may be received as a signal from an accelerator pedal and/or brake pedal. The driver propulsion demand may also be received as a signal from a speed control system (e.g., cruise control). The driver power demand may further include power for operating accessories and electrical systems in the vehicle (e.g., heating/cooling systems). The hybrid-electric powertrain may operate the engine 118 and electric machines 114 to achieve the driver power demand. In a normal mode of operation, an operating point for the engine 118 and the electric machines 114 may be determined to satisfy the driver power demand. The operating points may further include an amount of power to be delivered or provided to the traction battery 124. For example, the operating points may include a power split between the engine 118 and the electric machines 114. In a normal mode of operation, the traction battery 124 may charge and discharge during the drive cycle in a manner to optimize fuel economy and to maintain operation of the traction battery 124 within predetermined operating limits. For example, the engine 118 may be operated at a most fuel efficient operating point and the power output of the electric machines 114 may be varied to satisfy the driver power demand.

Figure 2:
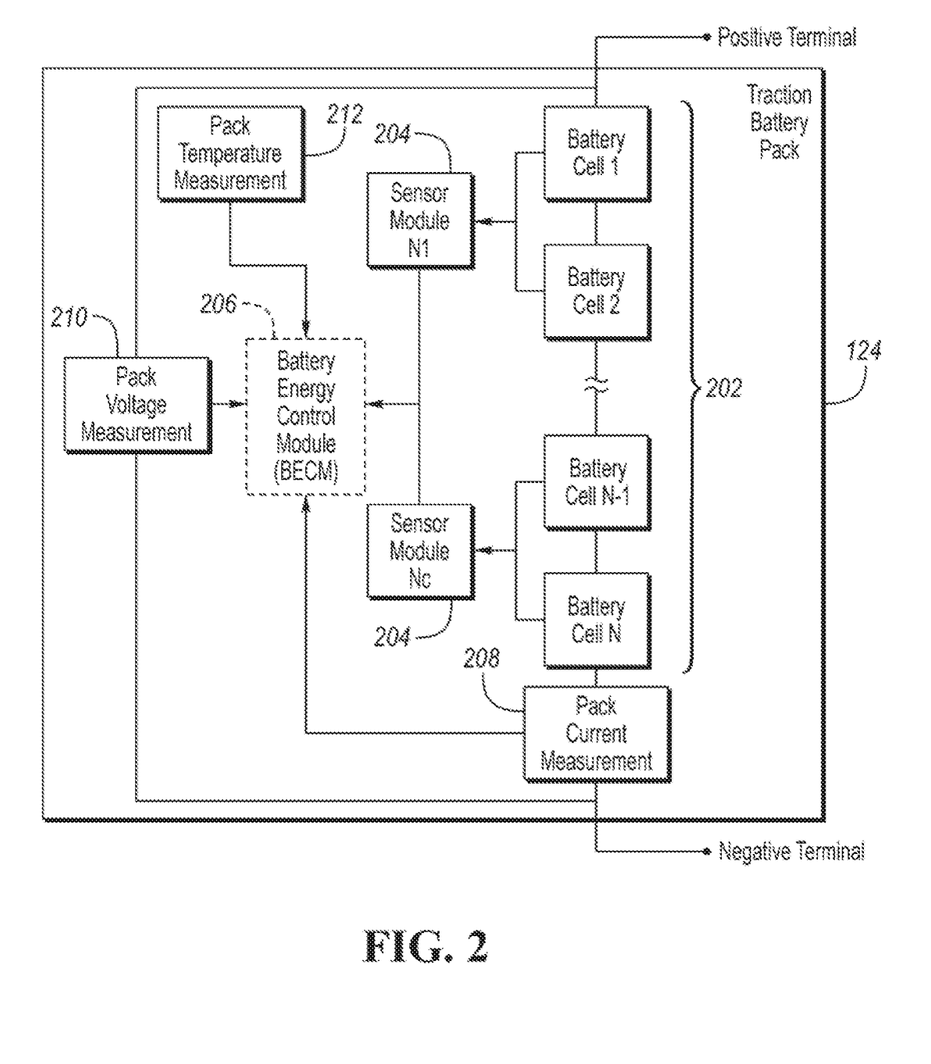
FIG. 2 is a possible configuration for a traction battery.

The traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212, The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the contactor module 142 for opening and closing the associated contactors.

It may be useful to calculate various characteristics of the battery pack. Quantities such as battery power capability, battery capacity, and battery state of charge may be useful for controlling the operation of the traction battery 124 as well as any electrical loads receiving power from the traction battery 124. Battery power capability is a measure of the maximum amount of power the traction battery 124 can provide or the maximum amount of power that the traction battery 124 can receive. Knowing the battery power capability allows the electrical loads to be managed such that the power requested is within limits that the traction battery 124 can handle. The above-mentioned characteristics may also be computed for individual or sub-groups of the battery cells 202. The following systems and methods may be applied at a traction battery 124 or battery cell 202 level.

Battery capacity is a measure of a total amount of energy that may be stored in the traction battery 124. The battery capacity may be expressed in units of Amp-hours. Values related to the battery capacity may be referred to as amp-hour values. The battery capacity of the traction battery 124 may decrease over the life of the traction battery 124.

State of charge (SOC) gives an indication of how much charge remains in the traction battery 124. The SOC may be expressed as a percentage of the total charge relative to the battery capacity remaining in the traction battery 124. The SOC value may be output to a display to inform the driver of how much charge remains in the traction battery 124, similar to a fuel gauge. The SOC may also be used by other controllers (e.g., VSC 148) to control the operation of the hybrid-electric vehicle. Calculation of SOC can be accomplished by a variety of methods. One possible method of calculating SOC is to perform an integration of the traction battery current over time. This is well-known in the art as ampere-hour integration. Additionally, a relationship between an open-circuit voltage of the battery measured after a rest period and the state of charge may be derived by analysis and/or testing. The SOC may be utilized by the BECM 206 to determine when the traction battery 124 has achieved a full charge. A full charge may be detected when the SOC is greater than a predetermined threshold (e.g., 95%). The predetermined threshold may be an SOC value above which a manufacturer discourages operation of the traction battery 124. The predetermined threshold may depend upon the battery chemistry and operating strategy of the traction battery 124. A full charge may also be detected when an open-circuit voltage of the traction battery 124 exceeds a predetermined voltage threshold.

The traction battery 124 and/or battery cell 202 may be characterized by an open-circuit voltage. The open-circuit voltage is the voltage measured at the battery terminals when the battery is not charging or discharging. During operation of the traction battery (e.g., charging and discharging) the voltage measured at the battery terminals (terminal voltage) may not reflect the open-circuit voltage due to impedance of the battery. The terminal voltage may accurately reflect the open-circuit voltage after the battery is relaxed. Relaxation occurs during the time after which charging and discharging terminates. During the relaxation period, the terminal voltage may rise or decay to the open-circuit voltage.

One strategy for computing the state of charge of the traction battery 124 is to measure the open-circuit voltage (OCV) and determine the SOC based on a known SOC-OCV relationship. For example, a relationship between OCV and SOC may be determined for the traction battery 124 during testing and development. The OCV-SOC relationship may be stored in memory as a lookup table. The OCV may be measured when the traction battery 124 is at rest or when no current is flowing. In some cases, the OCV may be measured after a predetermined rest period. For example, the OCV may be measured immediately prior to the next ignition or charge cycle. This helps to ensure a long rest period. Issues may occur when the OCV is measured immediately after the traction battery 124 has been charging or discharging. Due to chemical processes within the battery, the OCV may not settle to a stable value for a period of time after charging and discharging.

Other strategies may be implemented. In some cases, the OCV may be measured a predetermined time after the current has ramped down to zero. The predetermined time may be a calibratable time period. After the predetermined time, the OCV may be measured as the battery terminal voltage.

Changes in battery capacity over the battery lifetime can affect the accuracy of the SOC estimation. As such, battery capacity may be estimated to ensure that the changes are considered. The battery capacity may be estimated by integrating the total current entering and exiting the battery over time and an estimated or measured change in SOC (delta SOC). During battery discharging, the current may fluctuate. In addition, the change in SOC may be small. As such, estimating the battery capacity based on the discharge current may be less accurate. For plug-in hybrid electric vehicles, the battery capacity may be measured during a charge cycle. A plug-in hybrid electric vehicle may charge at a constant current over a long period of time. However, battery charging for a FHEV is not predictable. For example, the driver power demand may vary changes the operation of the traction battery 124 during the drive cycle. As such, charging is not predictable during vehicle operation.

To provide an accurate estimate of battery capacity, the operating strategy of the hybrid-electric powertrain may be modified for predetermined time periods to create conditions suitable for estimating battery capacity accurately. A battery capacity estimation cycle may be defined that creates predictable conditions for estimating battery capacity during vehicle operation.

Figure 3:
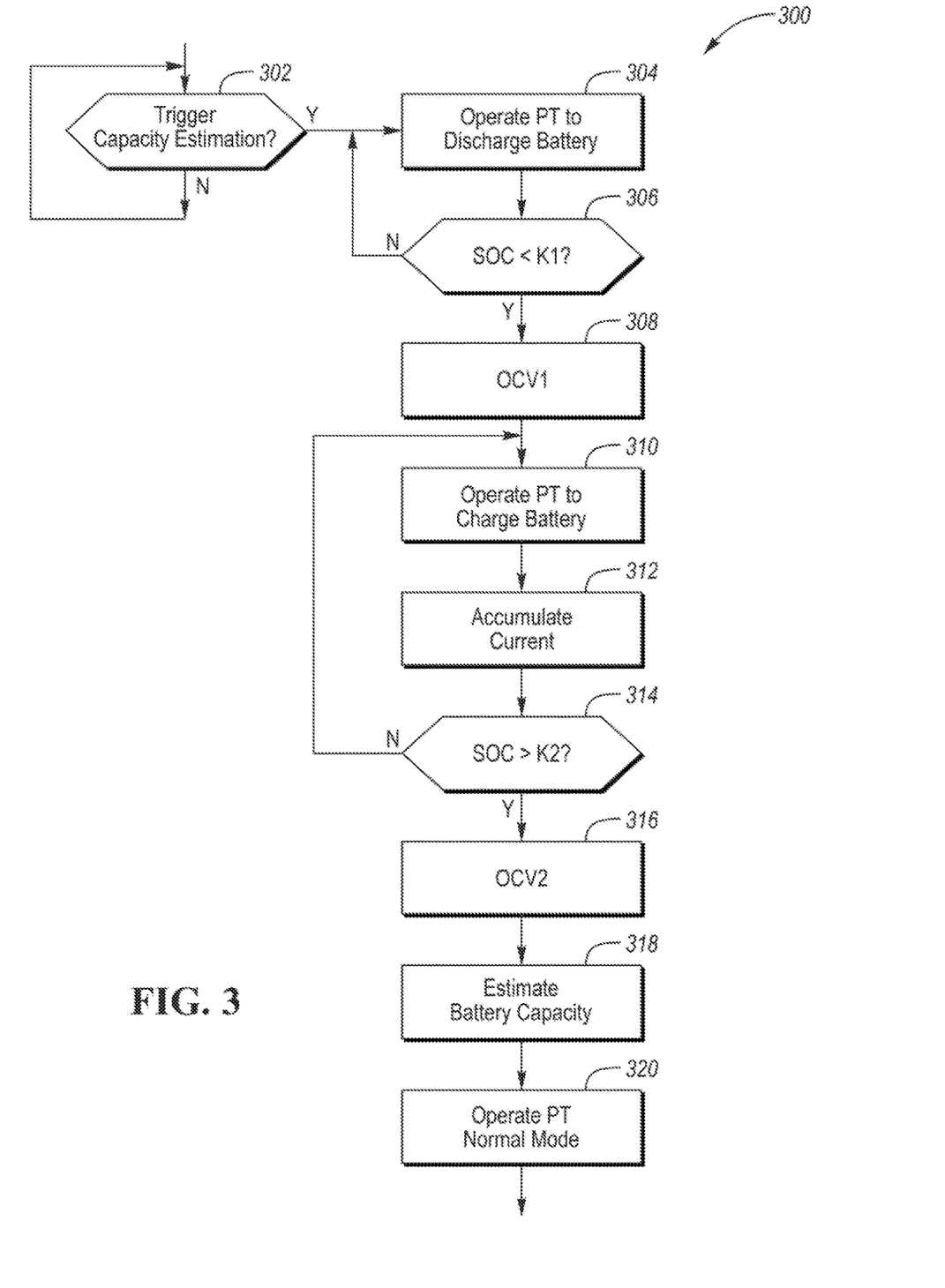
FIG. 3 is a flowchart for a possible sequence of operations for operating a vehicle powertrain for estimating a capacity of the traction battery.

FIG. 3 depicts a flow chart 300 for a possible sequence of operations for causing conditions for accurately estimating the battery capacity. At operation 302, a check may be performed to evaluate if the battery capacity estimation trigger conditions are satisfied. The controller may be programmed to monitor current leaving the traction battery 124 and accumulate a value representing the accumulated current over time (e.g., Amp-hour accumulation). The accumulated current may then be compared to a threshold. The accumulated current may be current provided by the traction battery 124 and may be accumulated over a predetermined time interval. If the accumulated current is greater than a threshold, then conditions may be present for triggering the battery capacity estimation. In some configurations, the capacity estimation may be triggered after expiration of a predetermined time interval. If the conditions are present for triggering the battery capacity estimation, then operation 304 may be performed. If conditions are not present for triggering the battery capacity estimation, then operation 302 may be repeated.

At operation 304, the hybrid-electric powertrain may be operated such that the traction battery 124 is continuously discharged while continuing to satisfy the driver power demand. The controller may be programmed to prevent charging of the traction battery 124 and operate the hybrid-electric powertrain in a battery discharge-only mode. The controller may be programmed to operate the engine 118 and the electric machines 114 to continuously discharge the traction battery 124 and satisfy the driver power demand. For example, the electric machine 114 may be operated to draw power from the traction battery 124. The controller may monitor the SOC of the traction battery 124 during this time (e.g., Amp-hour integration). The controller may monitor the change in SOC from the start of the battery capacity estimation cycle. Note that the controller may include coordinated effort from the powertrain controller (e.g., VSC 148) and the BECM 206. For example, the BECM 206 may be programmed to request the powertrain controller 148 to operate the engine 118 and the electric machines 114 in the prescribed manner.

Operation in the battery discharge-only mode may include changing the operating point of the engine 118 and the electric machines 114. For example, the electric machines 114 may be operated to provide propulsive power to consume energy from the traction battery 124. In this mode, the engine 118 may be operated to provide less propulsive power than in a normal mode of operation. Engine 118 and electric machine 114 operation may be altered in this mode to provide the power demand. The power split between the engine 118 and the electric machine 114 may change in this mode of operation. Operation in the battery discharge-only mode may be less fuel efficient than in the normal mode of operation.

At operation 306, the SOC of the traction battery 124 may be compared to a first threshold (K1). If the SOC is greater than or equal to the first threshold, operation 304 may be repeated. If the SOC is less than the first threshold, operation 308 may be performed. The first threshold may be a predetermined SOC value representing a lower SOC value from which the traction battery 124 will be recharged.

At operation 308, the controller may initiate or request a first OCV measurement. The first OCV measurement may be performed when the discharge-only mode is completed. At this time, the controller may operate the engine 118 and the electric machines 114 such that there is zero current flowing into or out of the traction battery 124. The engine 118 and the electric machine 114 may be operated such that no current flows into or from the traction battery 124 for a predetermined amount of time while continuing to satisfy the driver power demand. At the end of the predetermined amount of time, the controller may measure the terminal voltage of the traction battery 124. From this first OCV measurement (OCV1), a starting SOC may be computed using the stored relationship between OCV and SOC.

Once the starting SOC value is known, operation 310 may be performed. The controller may operate or request operation of the hybrid-electric powertrain in a battery charge-only mode. In the battery charge-only mode, the controller may operate the engine 118 and the electric machines 114 to continuously charge the traction battery 124 at a predetermined current while continuing to satisfy the driver power demand. The controller may control the operation of the engine 118 and the electric machines 114 to generate a predetermined constant charging current to the traction battery 124.

At operation 312, the controller may monitor the current and accumulate or integrate the current over the interval in which the traction battery 124 is charged. During this time, the engine 118 and electric machines 114 are operated to maintain the constant current charging and to achieve the driver power demand. In this mode, the engine 118 may be used to provide power for any changes to the driver power demand. During these operation, the controller may continue to evaluate and monitor the SOC (e.g., Amp-hour integration).

At operation 314, the controller may compare the SOC to a second threshold (K2). When the SOC exceeds the second threshold, operation 316 may be performed to exit the battery charge-only mode. The second threshold may represent an upper SOC limit. If the SOC does not exceed the second threshold, operation 310 and operation 312 may be repeated.

At operation 316, the controller may request a second OCV measurement. Prior to measuring the OCV, the controller may operate the engine 118 and electric machines 114 to ramp the current down to zero. The engine 118 and the electric machine 114 may be operated such that no current flows into or from the traction battery 124 for a predetermined amount of time while continuing to satisfy the driver power demand. At the end of the predetermined amount of time, the controller may measure the terminal voltage of the traction battery 124. From this second OCV measurement, an ending SOC may be computed using the known relationship between OCV and SOC.

At operation 318, the controller may estimate the capacity of the traction battery 124. At this point, the controller knows the starting SOC, the ending SOC, and the accumulated current over the interval. The battery capacity may be computed as:

$$\text{Capacity} = \frac{\int I\, dt}{SOC_{end} - SOC_{start}}$$

The battery capacity may be the ratio of the accumulated current over the time interval to the change in SOC over the time interval.

At operation 320, the hybrid-electric powertrain may be operated in the normal mode of operation. For example, the engine 118 and the electric machines 114 may be operated to satisfy the driver power demand at a most fuel efficient power split. The traction battery 124 may be charged or discharged according to the normal operating strategy.

The battery capacity estimation cycle causes a period of constant current battery charging that would not normally occur during a drive cycle. The period of constant charging may be preceded by a period of only discharging.

The strategy disclosed allows battery capacity to be accurately measured during a drive cycle without affecting vehicle performance. The accurate estimation of battery capacity allows improved operation of the traction battery 124 over the life of the traction battery 124. In addition, performance thresholds can be adjusted to ensure operation of the traction battery 124 within recommended operating limits. Further, the accurate capacity estimate results in more accurate reporting of battery parameters to the operator and service technicians.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   an engine and an electric machine; and
   a controller programmed to (i) operate the engine and the electric machine to satisfy a driver power demand during a drive cycle, (ii) responsive to a value representing an accumulated current leaving the traction battery exceeding a predetermined threshold, operate the engine and the electric machine to continuously discharge the traction battery and satisfy the driver power demand, (iii) responsive to a state of charge of the traction battery falling below a first threshold, operate the engine and the electric machine to continuously charge the traction battery at a predetermined current and satisfy the driver power demand, and (iv) responsive to the state of charge exceeding a second threshold, operate the engine and the electric machine to satisfy the driver power demand such that the traction battery is charged and discharged.

2. The vehicle of claim 1, wherein the controller is further programmed to, responsive to the state of charge falling below the first threshold, operate the engine and the electric machine such that no current flows into or from the traction battery for a predetermined time interval and satisfy the driver power demand.

3. The vehicle of claim 1, wherein the controller is further programmed to, responsive to the state of charge exceeding the second threshold, operate the engine and the electric machine such that no current flows into or from the traction battery for a predetermined time interval and satisfy the driver power demand.

4. The vehicle of claim 1, wherein the controller is further programmed to, responsive to the state of charge exceeding the second threshold, operate the engine and the electric machine to ramp a current supplied to the traction battery to zero and satisfy the driver power demand.

5. The vehicle of claim 1, wherein the predetermined current is a constant current.

6. The vehicle of claim 1, wherein the first threshold is less than the second threshold.

7. The vehicle of claim 1, wherein the controller is further programmed to, responsive to the state of charge exceeding the second threshold, output a battery capacity estimate based on a first state of charge estimated immediately prior to continuously charging the traction battery, a second state of charge estimated after continuously charging the traction battery, and an integration of battery charge current over a duration associated with continuous charging.

8. A battery management system for a vehicle comprising:
a traction battery; and
a controller programmed to, (i) responsive to a value representing an accumulated current leaving the traction battery exceeding a predetermined threshold, request a powertrain controller to operate an engine and an electric machine to continuously discharge the traction battery, (ii) responsive to a state of charge of the traction battery falling below a first threshold, request the powertrain controller to operate the engine and the electric machine to continuously charge the traction battery at a predetermined current, and (iii) responsive to the state of charge exceeding a second threshold, change and output an estimate of a capacity of the traction battery.

9. The battery management system of claim 8, wherein the controller is further programmed to, change the estimate of the capacity based on a first state of charge estimated immediately prior to continuously charging the traction battery, a second state of charge estimated after continuously charging the traction battery, and an integration of battery charge current over a duration associated with continuous charging.

10. The battery management system of claim 8, wherein the controller is further programmed to, responsive to a state of charge of the traction battery falling below the first threshold, request the powertrain controller to operate the engine and the electric machine such that no current flows into or from the traction battery for a predetermined time interval.

11. The battery management system of claim 10, wherein the controller is further programmed to, responsive to expiration of the predetermined time interval, estimate an initial state of charge based on a measurement of a terminal voltage of the traction battery.

12. The battery management system of claim 8, wherein the controller is further programmed to generate a value that is an integration of a current flowing into the traction battery over a time interval in which the traction battery is continuously charged.

13. The battery management system of claim 8, wherein the controller is further programmed to, responsive to a state of charge of the traction battery exceeding the second threshold, request the powertrain controller to operate the engine and the electric machine such that no current flows into or from the traction battery for a predetermined time interval.

14. The battery management system of claim 13, wherein the controller is further programmed to, responsive to expiration of the predetermined time interval, estimate a final state of charge based on a measurement of a terminal voltage of the traction battery.

15. The battery management system of claim 8, wherein the controller is further programmed to, responsive to changing the estimate of the capacity, charge and discharge the traction battery according the estimate.

16. A method of operating a vehicle comprising:
operating by a controller an engine and an electric machine to satisfy a driver power demand and to continuously discharge a traction battery responsive to a value representing an accumulated current leaving the traction battery exceeding a predetermined threshold;
operating by the controller the engine and the electric machine to satisfy the driver power demand and to continuously charge the traction battery at a predetermined current responsive to the traction battery having been discharged to a first state of charge below a lower threshold;
operating by the controller the engine and the electric machine to satisfy the driver power demand responsive to the traction battery having been charged to a second state of charge exceeding an upper threshold; and
changing by the controller an estimate of a capacity of the traction battery responsive to the traction battery having been charged to the second state of charge.

17. The method of claim 16 further comprising operating the engine and the electric machine to satisfy the driver power demand such that no current flows into or from the traction battery for a predetermined time interval responsive to the traction battery having been discharged to the first state of charge.

18. The method of claim 16 further comprising operating the engine and the electric machine to satisfy the driver power demand such that no current flows into or from the traction battery for a predetermined time interval responsive to the traction battery having been charged to the second state of charge.

19. The method of claim 16 further comprising operating the engine and the electric machine to satisfy the driver power demand according to a power split that minimizes fuel usage responsive to the estimate of the capacity being changed.

20. The method of claim 16 further comprising charging and discharging the traction battery according to the estimate of the capacity.

* * * * *